Jan. 28, 1941.　　　O. J. SUNDSTRAND　　　2,229,905
ACCOUNTING MACHINE
Filed Oct. 31, 1934　　　11 Sheets-Sheet 6
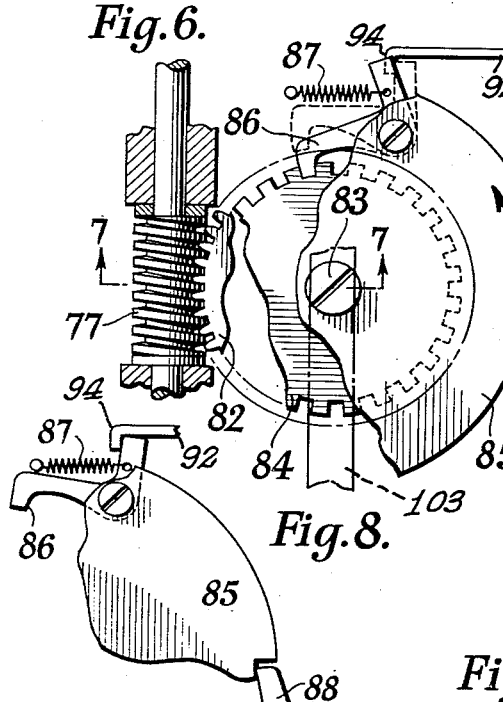
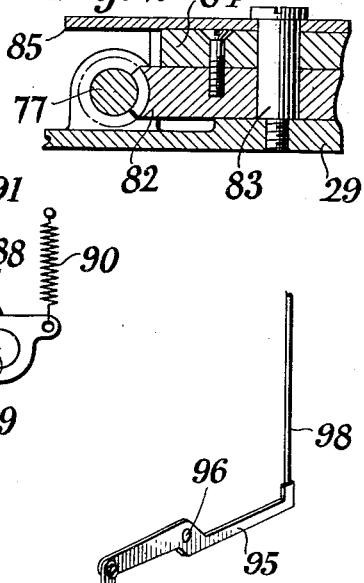
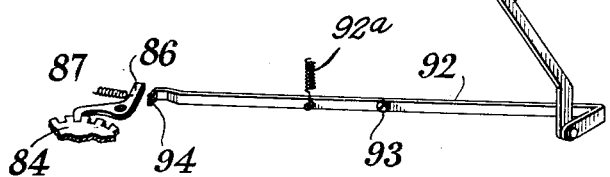
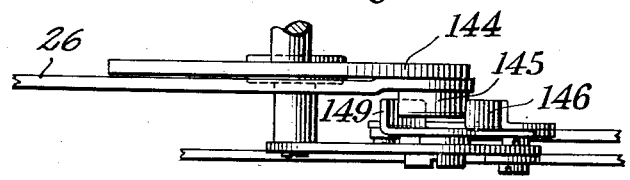
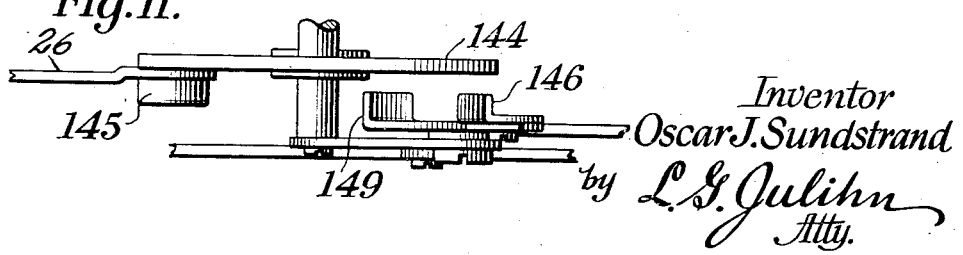
Inventor
Oscar J. Sundstrand
by L. G. Julihn
Atty.

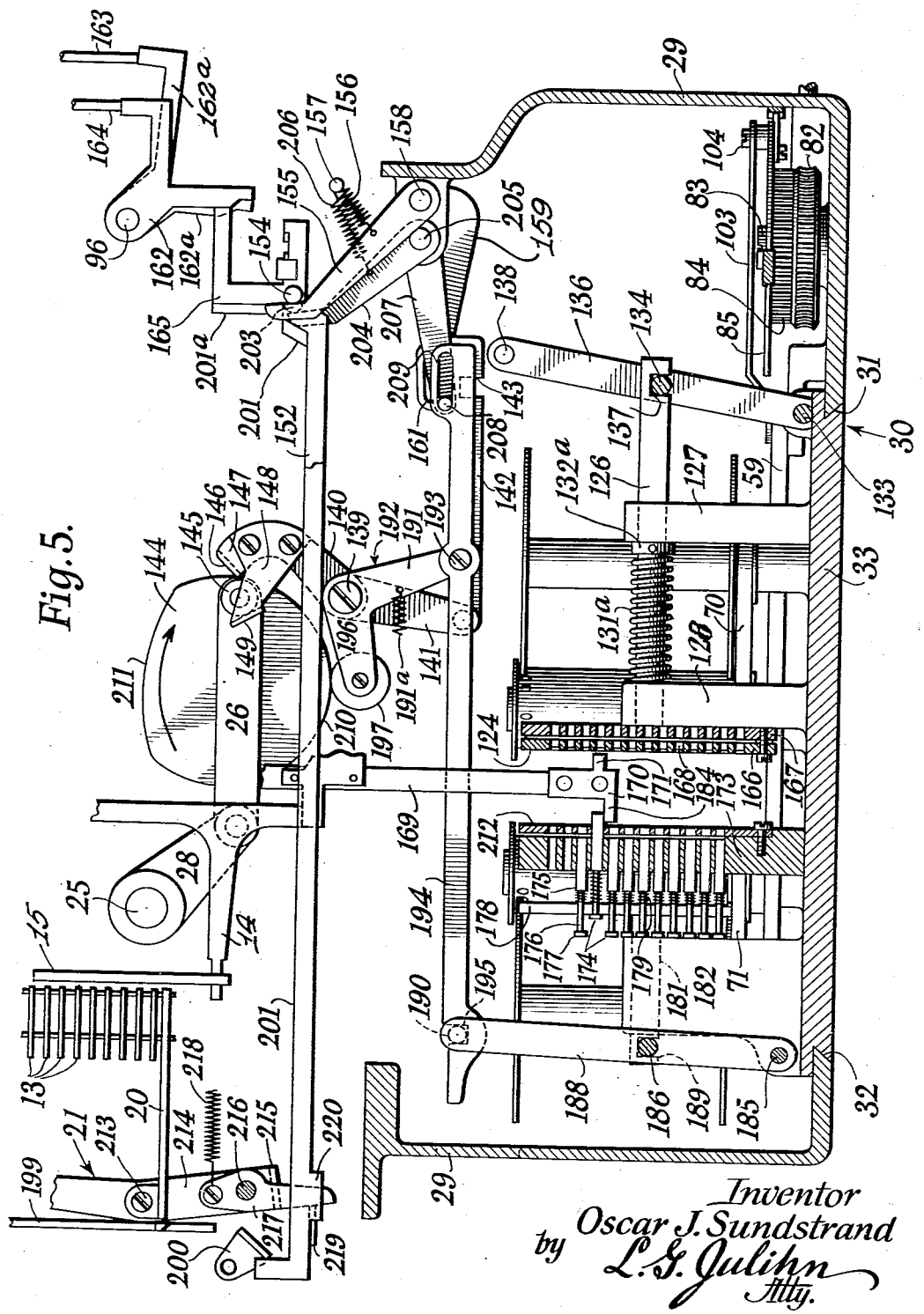

Jan. 28, 1941.　　　O. J. SUNDSTRAND　　　2,229,905
ACCOUNTING MACHINE
Filed Oct. 31, 1934　　　11 Sheets-Sheet 7
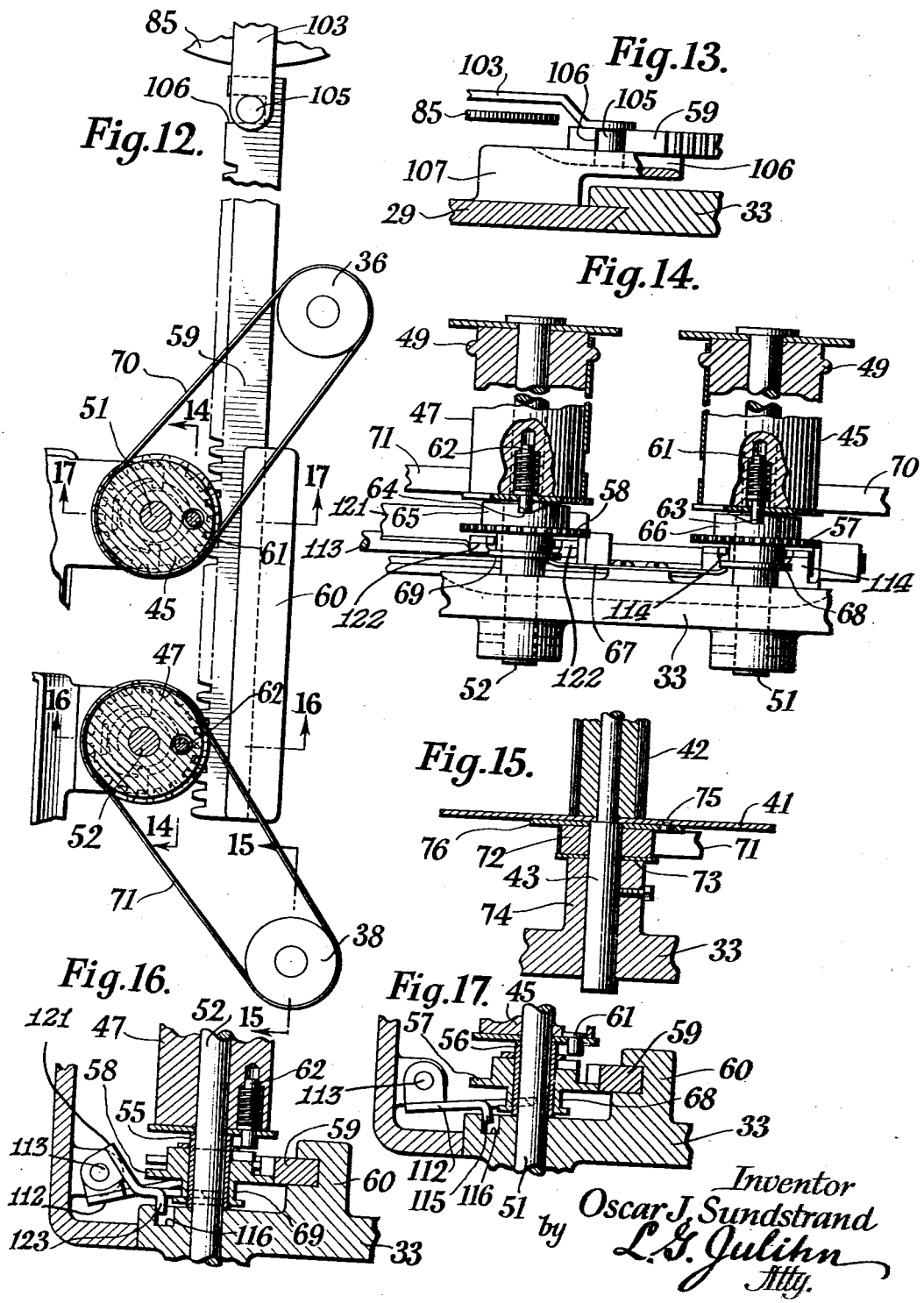

Jan. 28, 1941.  O. J. SUNDSTRAND  2,229,905
ACCOUNTING MACHINE
Filed Oct. 31, 1934   11 Sheets-Sheet 8
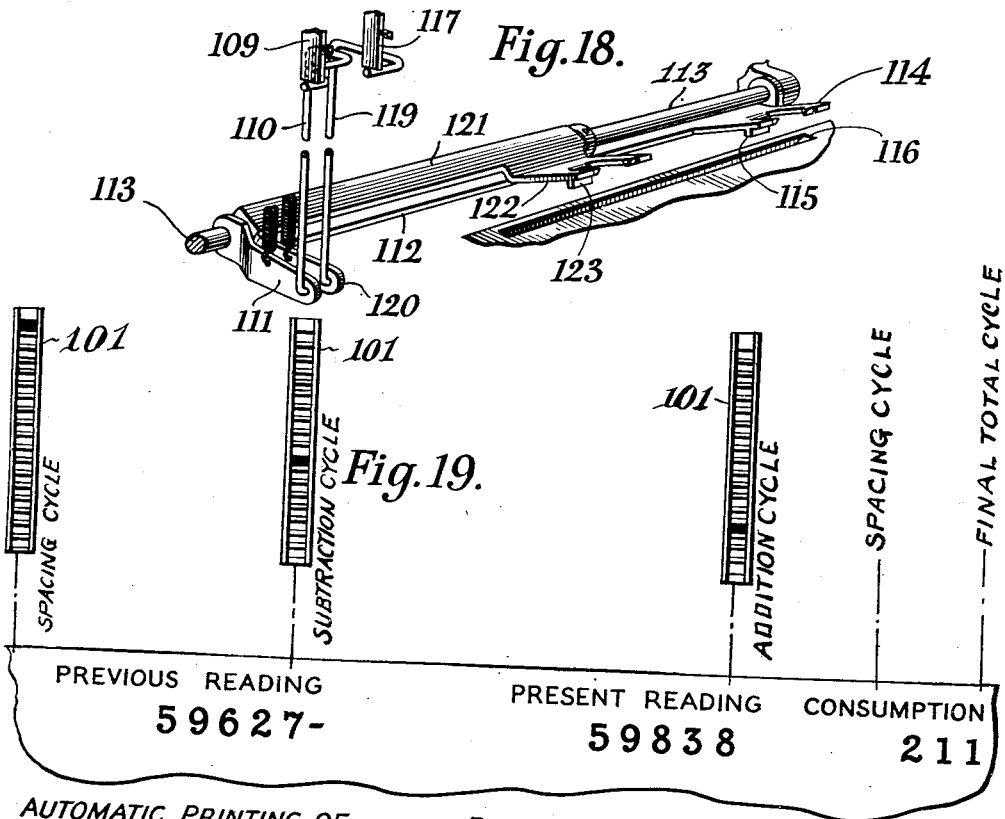
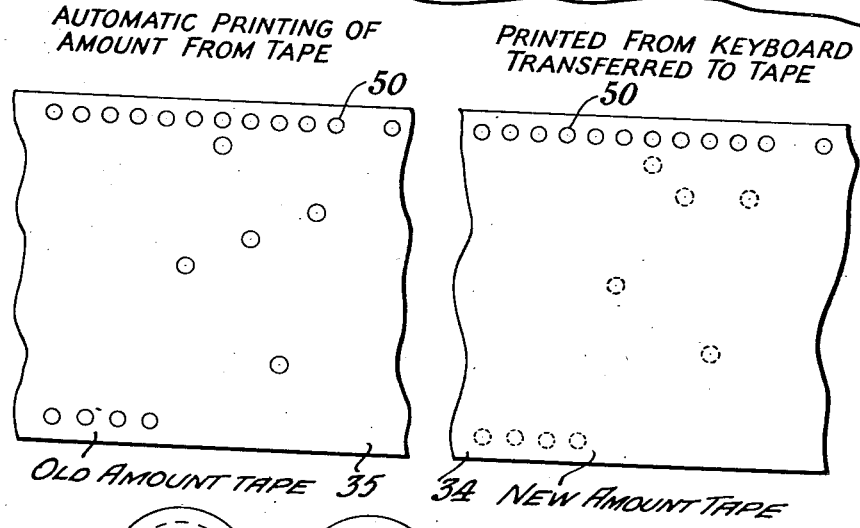
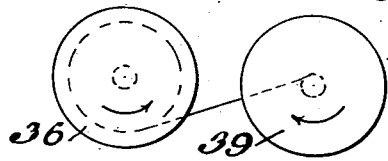

Jan. 28, 1941.　　　O. J. SUNDSTRAND　　　2,229,905
ACCOUNTING MACHINE
Filed Oct. 31, 1934　　　11 Sheets-Sheet 9
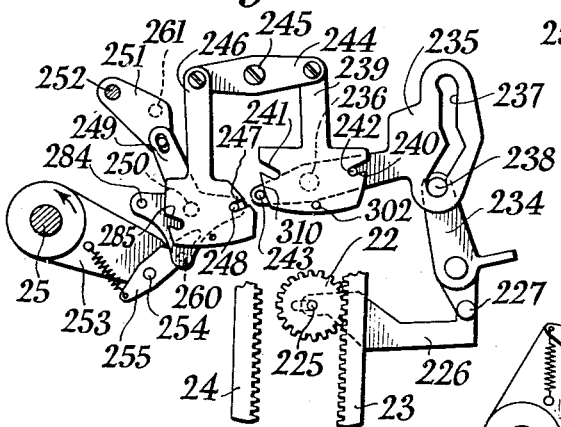
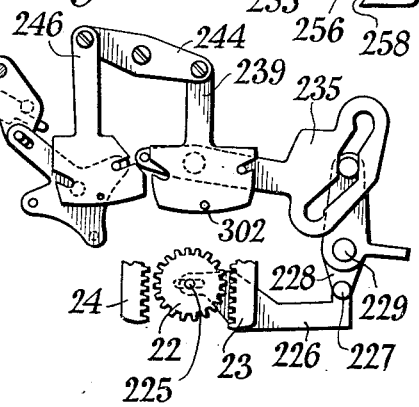
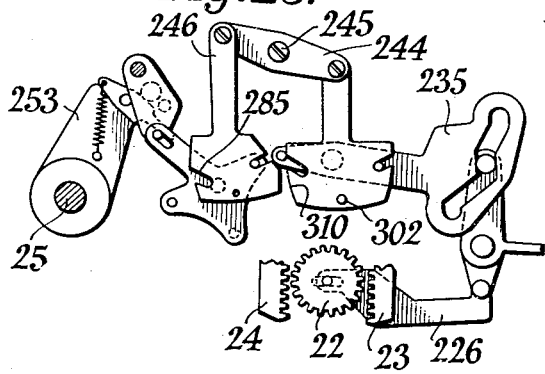
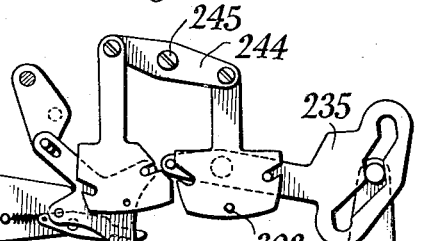
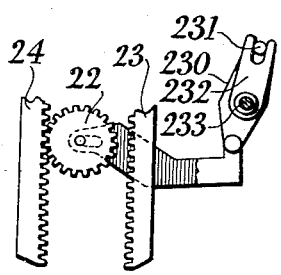
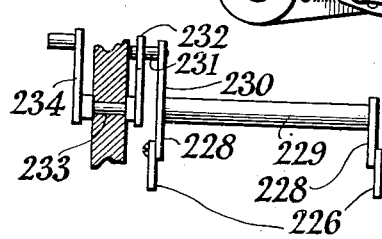
Inventor.
Oscar J. Sundstrand
L. G. Julihn
Atty.

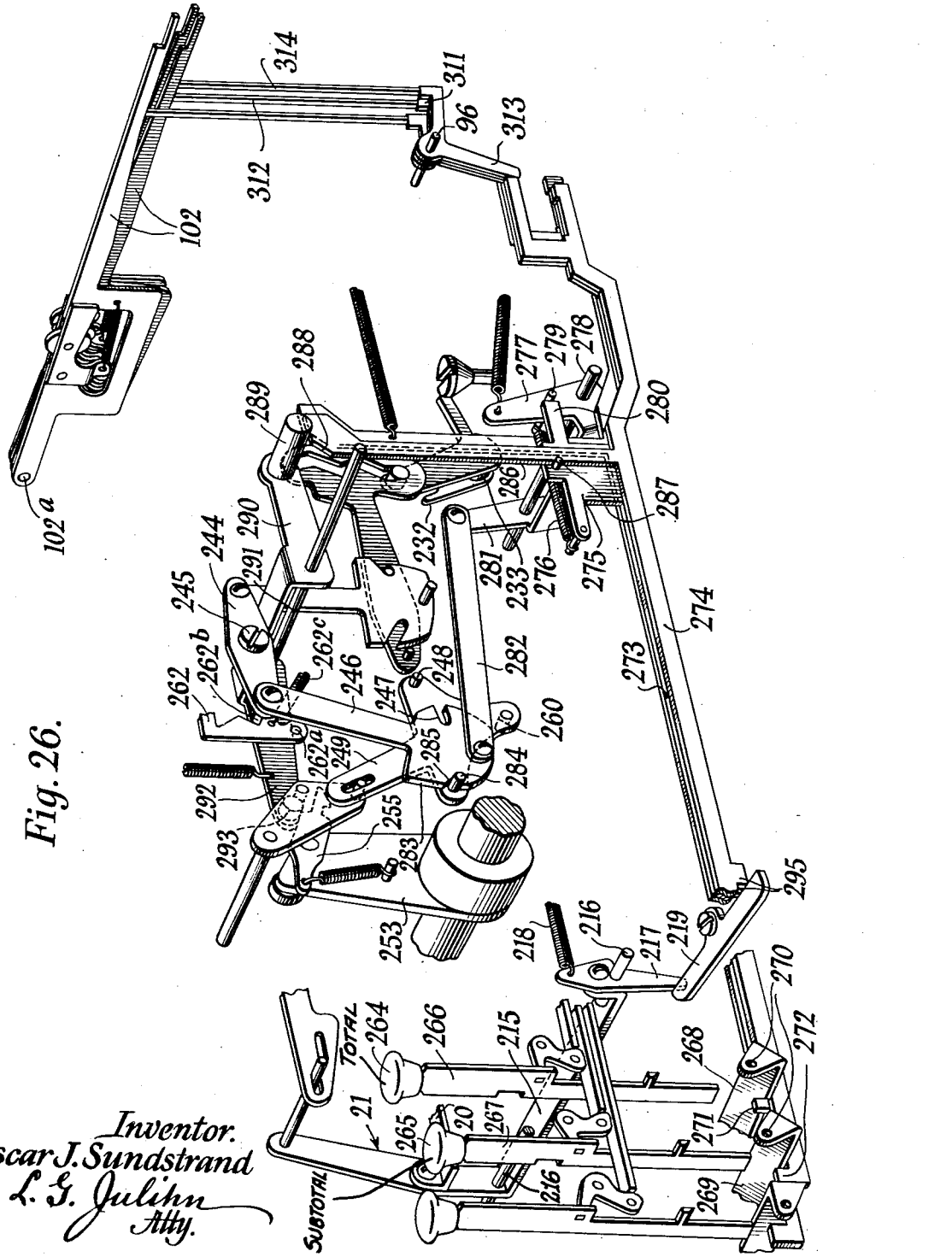

Patented Jan. 28, 1941

2,229,905

UNITED STATES PATENT OFFICE 2,229,905

ACCOUNTING MACHINE

Oscar J. Sundstrand, Bridgeport, Conn., assignor to Underwood Elliott Fisher Company, New York, N. Y., a corporation of Delaware Application October 31, 1934, Serial No. 750,779

11 Claims. (Cl. 235—60)

The invention relates generally to new and useful improvements in accounting machines. Accounting practice frequently involves the maintenance of running accounts, that is, accounts which are carried from month to month, either with or without a complete settlement of the account being effected at the conclusion of each such month.

Thus, it becomes necessary, in determining the charge to be rendered against any particular account in a given month, to carry forward the debit or credit balance of that account from the preceding month.

One species of this generic form of accounting arises in connection with public utility billing, in which the customer's consumption of the commodity, such, for example, as gas or electricity, is calculated on the basis of the difference between the prior and current month's readings of a meter arranged to cumulatively register total consumption.

It is accordingly an object of the present invention to provide new and improved means for the production of records of account which represent a given month's charges as determined by, and related to, the charge rendered in a preceding month.

A further object resides in the provision of a machine of the above character adapted to simultaneously print, register and store an amount representative of a given current charge.

Yet another object of the invention is the provision of a unitary machine automatically operable to print, and register, an amount representative of a previously rendered charge under control of a permanent record in the form of a perforated tape.

Other objects and advantages of the present invention will become apparent in connection with the following detailed description of one form of machine embodying the invention.

In the accompanying drawings,

Fig. 5 is an elevational view similar to Fig. 4 but showing the operation of setting up the old amount under the control of a perforated tape;

Fig. 6 is a plan view of one form of actuating mechanism;

Fig. 7 is a vertical sectional view taken on the lines 7—7 of Fig. 6;

Fig. 8 is a fragmentary plan view of part of the mechanism shown in Fig. 6;

Fig. 9 is a perspective view of the carriage actuated linkage adapted to control a machine function;

Fig. 10 is a fragmental detail of part of the mechanism shown in Figs. 4 and 5;

Fig. 11 is a fragmental view of the mechanism shown in Fig. 10, parts being in a position corresponding with Fig. 2;

Fig. 12 is a fragmental plan view of a preferred form of tape shifting mechanism;

Fig. 13 is a left-hand elevation of certain parts of the mechanism shown in Fig. 12;

Fig. 14 is a detailed elevational view taken on the line 14—14 of Fig. 12;

Fig. 15 is a vertical elevational view taken on the line 15—15 of Fig. 12;

Fig. 16 is a sectional view of certain of the mechanism shown in Figs. 14 and 18;

Fig. 17 is a fragmentary view similar to Fig. 16 but showing parts of the mechanism of Fig. 14 not included in Fig. 16;

Fig. 18 is a fragmental perspective view of means to operate the mechanism shown in Figs. 14, 16 and 17;

Fig. 19 is a specimen of one kind of work adapted to be performed on a machine embodying the invention; and Fig. 20 is a diagrammatic plan view of an operation made preparatory to placing the machine in condition for recording a series of old amounts, or previous meter readings.

Figure 21 is a fragmental view illustrating the means for adjusting the totalizer for addition or subtraction, the parts being shown adjusted for addition and the main rock shaft being illustrated as having just begun to make its forward stroke.

Figure 22 is a similar view, but showing the positions assumed at the beginning of the return of the rock shaft.

Figure 23 illustrates the positions assumed during non-addition, the main rock shaft having just commenced its return stroke.

Figure 24 illustrates a later stage in the return stroke of the main rock shaft during non-addition.

Figure 25 is a detailed view of the crank arm and pawl carried by the main rock shaft for controlling the totalizer.

Figure 26 is a fragmental perspective view illustrating the non-add, sub-total and total mechanism of the totalizer, the parts being shown in the positions occupied when the main rock shaft is at the end of its forward stroke in the taking of a sub-total.

Figure 28 is a fragmental view showing the counter pinions engaged with the subtracting racks.

Figure 29 is a fragmental view looking from the right-hand side of Figure 28.

Figure 1:
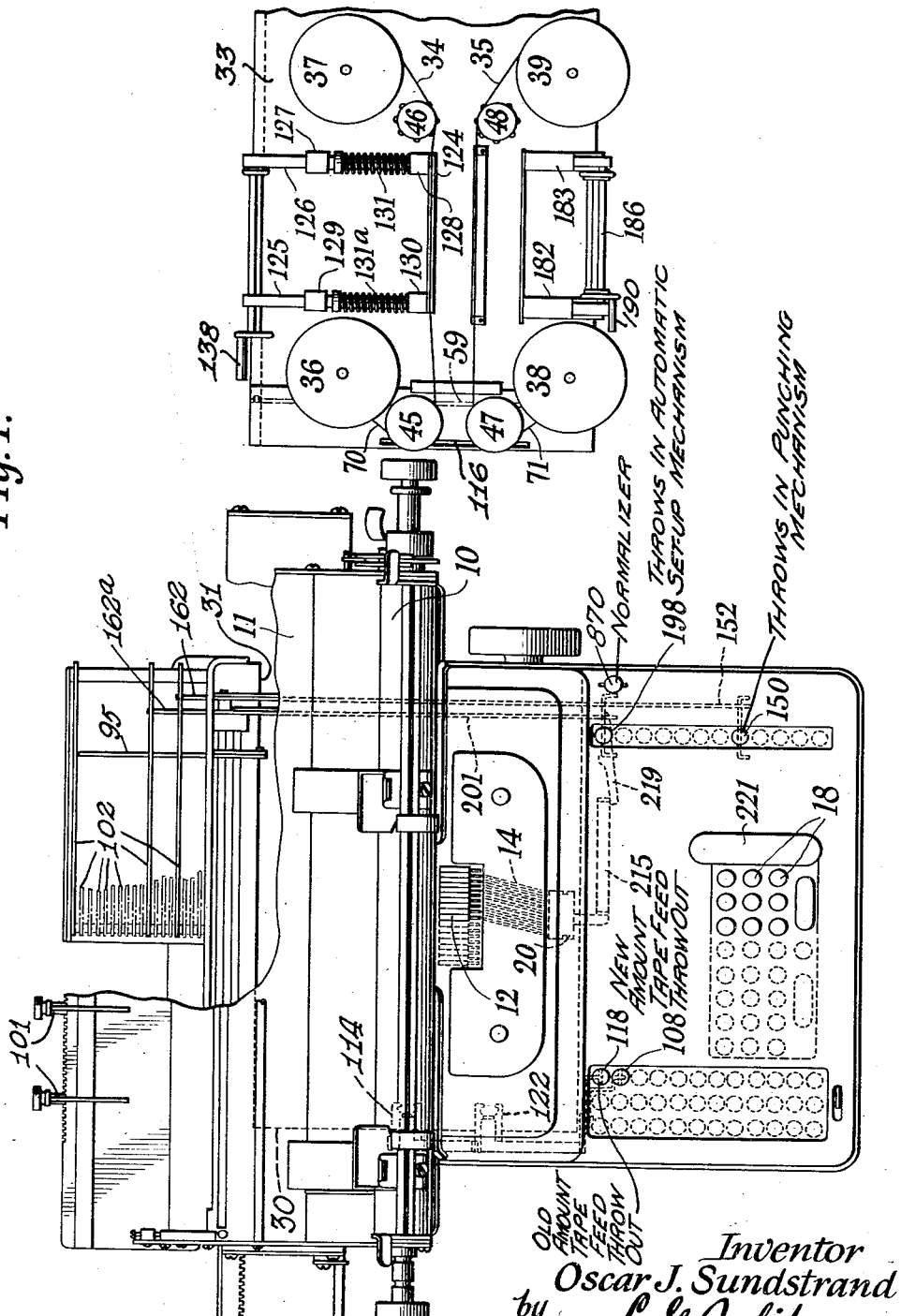
Figure 1 is a plan view of the machine illustrating one embodiment of the invention, a certain removable unit being shown as removed from operative position and certain other parts being broken away to better disclose particular elements.

The invention is herein exemplified in a machine of the general character disclosed in the Sundstrand application Serial No. 581,800, filed December 18, 1931, now Patent No. 2,194,270, dated March 19, 1940.

Reference may be had to the above-mentioned application for an understanding of features not fully illustrated or described herein. It should, however, be understood that the present invention is not limited to machines of the Sundstrand type.

The machine illustrated includes a platen 10, mounted in paper carriage 11, arranged for movement relative to a group of type bars 12.

Referring now to the means for setting up new amounts:

The means herein shown to limit the extent to which the type bars may rise, and so determine which numerals shall be brought to printing position, includes a stationary group of stops 13, which may be similar to those fully disclosed in the Sundstrand Patents Nos. 1,198,487 and 1,583,102, as well as in the beforementioned Sundstrand application. When moved rearwardly from the position shown in Figure 2, the stops are interposed in the path of movement of devices carried by the type bars and thereby limit upward movement of the latter. These devices consist of arms 14, pivoted to the lower portions of the type bars and stop pins 15, connected to the forward ends of the arms 14. The pins 15 are guided for vertical movement in a slide 16, which is mounted on a stationary guide rod 17, extending transversely of the machine. The guide rod 17 is so positioned with reference to the group of stops 13, that the slide 16 is movable to carry the pins 15 from their normal or initial position at the left hand side of the group of stops 13 into vertical alignment with the columns of stops.

The means for projecting the stops 13 into the path of the pins 15, comprises numeral keys 18 (Fig. 1) and a series of push pins (not shown) arranged to be projected rearwardly by the keys.

Figure 4:
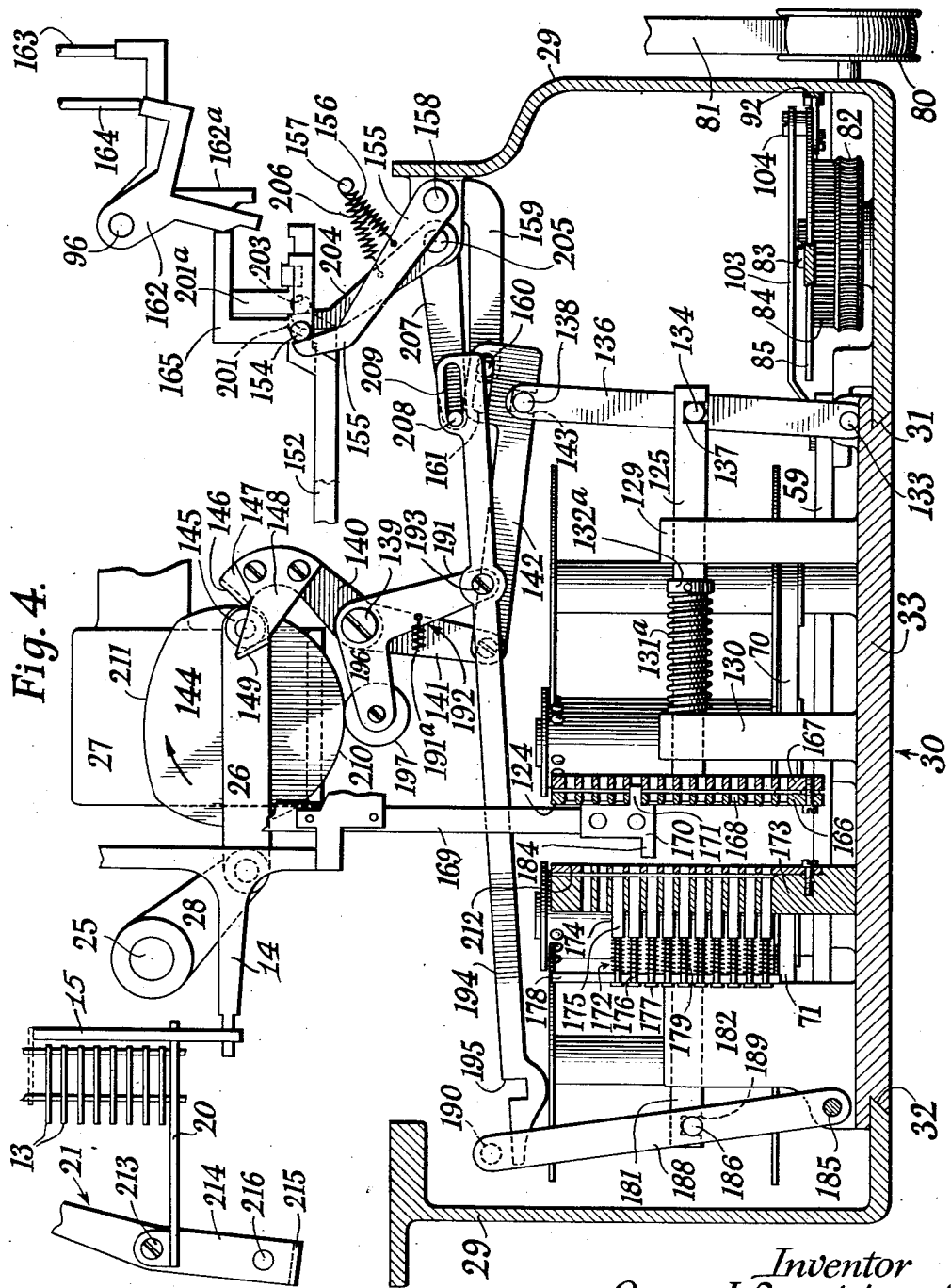
Fig. 4 is a fragmental right hand elevation of certain parts of the machine showing the operation of recording a new amount in a tape by means of perforations.

The stop pins 15, and consequently the type bars, are normally prevented from rising excepting in those instances in which an amount is entered in the key board, by a detent plate 20, which is positioned below and to one side of the group of stops 13 and is adapted to be moved rearwardly and forwardly, into and out of the path of said pins, by means fully disclosed in my abovementioned application and generally indicated herein at 21 (Fig. 4).

The movement of the type bars 12 is adapted to be communicated to a totalizer 22 similar in all respects to the corresponding mechanism of my beforementioned application Serial No. 581,800, by groups of racks 23 or 24, respectively. Addition occurs in the down stroke of racks 23, subtraction is effected during the downward stroke of racks 24, positive total-taking occurs in the up stroke of the racks 23, and negative total-taking is done in the up stroke of the racks 24, the pinions being moved into meshing engagement with either set of racks in timed relation with upward or downward movement thereof as the case may be. It will be understood that the totalizer normally occupies a position in engagement with the adding racks. It will further be evident that the movement of the totalizer into meshing engagement with either of its respective sets of racks may be accomplished by means such as are fully disclosed in my applications Serial Nos. 581,800 and 118,628 (now Patent No. 2,088,982, dated Aug. 3, 1937), or my Patent No. 1,885,489.

Figure 2:
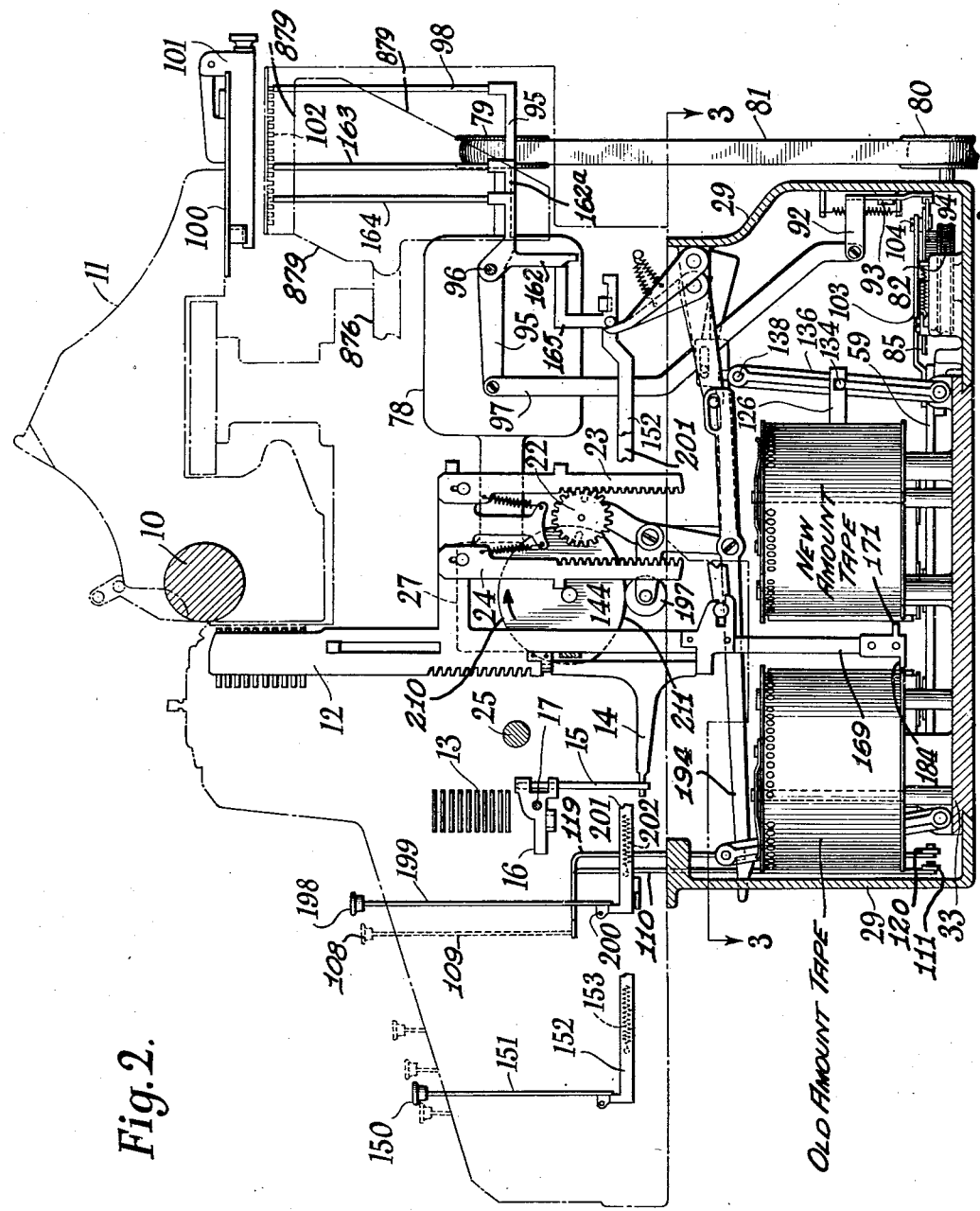
Fig. 2 is a right hand elevational view showing the machine in a neutral or rest position.

The several operative organizations of the machine are articulated, as fully disclosed in my before-mentioned applications, to a main rock shaft 25 (Figs. 2, 4, 5), which may in turn be actuated manually, or as in the present disclosure, by means of an electric motor 78 (Fig. 2). The motor 78 runs continuously until stopped by a time switch, as explained in application Serial No. 581,800. A link 26, driving cam 144, and a gear reduction unit 27, provide a driving connection between the motor 78 and a crank 28 rigid with the rock shaft 25.

Referring now to the mechanism for setting up old amounts: When an old amount is to be printed on the bill and accumulated in the totalizer 22, the rising movement of the type bars is controlled by means of a special group of stops comparable to the group of stops 13, the setting of which special stops is effected by springs which are controlled by a perforated tape. This tape is automatically perforated at the time that the new items are entered in the machine in connection with the preparation of a bill. At a subsequent time, when another bill is to be prepared, and it is desired to print on that bill the old amount, the tape thus perforated is utilized to control the setting of the special stops so as to effect the printing and accumulation of the old amount. It will thus be understood that whenever a bill is prepared, the new item is recorded in the form of perforations in a "new amount" tape, and the old amount is printed and accumulated under the control of an "old amount" tape, the "new amount" tape being used as the old amount tape when the next bill is to be prepared.

A depending housing 29 (Figs. 2, 4 and 5) secured to the under surface of the machine adjacent its rearward edge, is formed with an elongated opening 30, extending transversely of the principal axis of the machine, the respective opposite edges of the opening being beveled at 31 and 32 to provide a guiding and supporting edge for co-action with complementary transverse grooves formed in the corresponding edges of a base plate 33.

As indicated above, the invention includes the provision of means to permanently record or store an amount entered in the machine, as well as means sensitive to such a permanent or stored record to automatically control an operation of the machine.

To this end a tape 34 (Figs. 1 and 3), hereinafter designated the "new amount tape," is operatively supported on the base 33 in juxtaposition to a tape 35 subsequently referred to as the "old amount tape."

Figure 3:
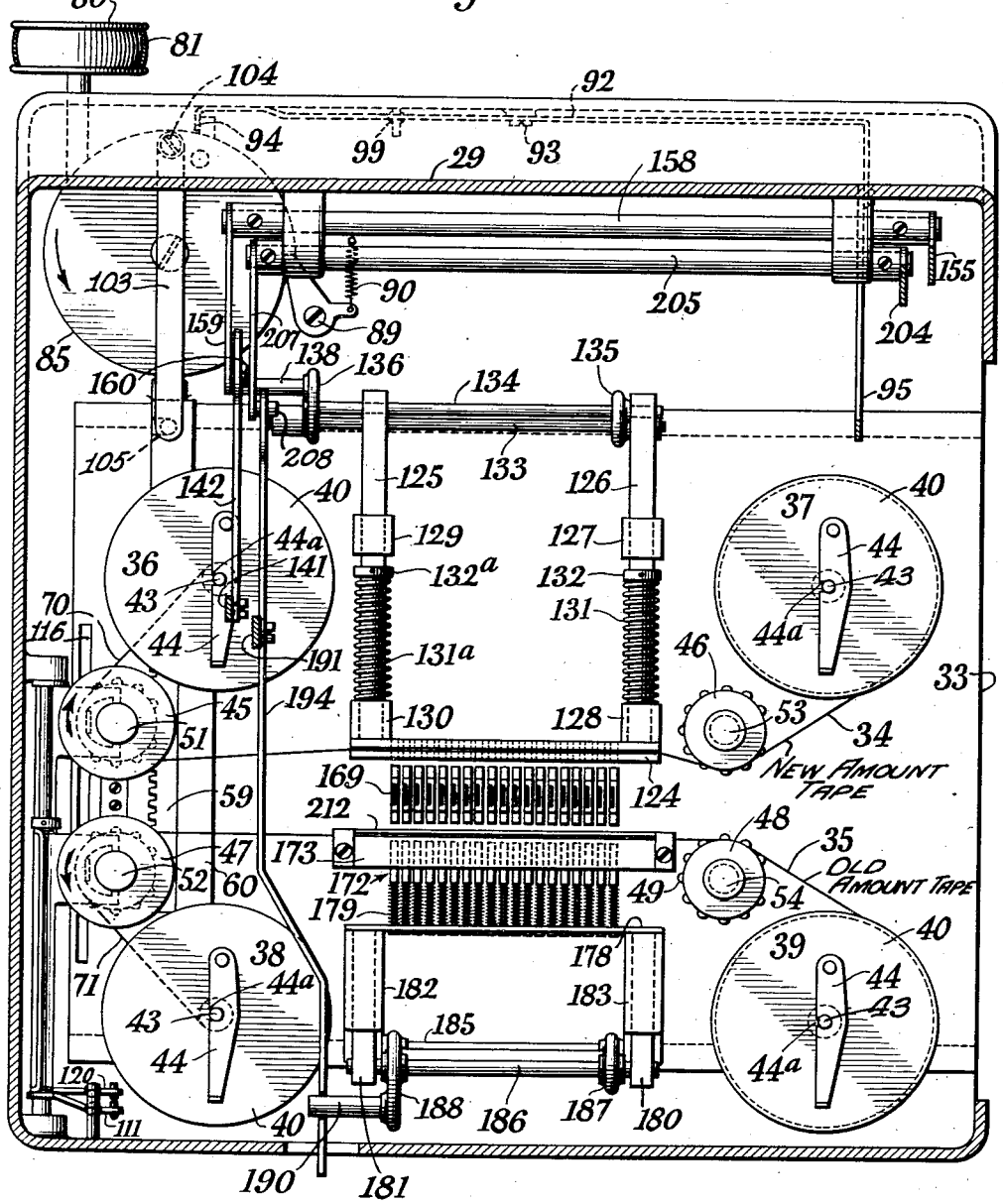
Fig. 3 is a sectional view taken on the lines 3—3 of Fig. 2.

Referring particularly to Figures 1, 3 and 12, the "new amount tape" is supported for movement relative to the base, upon a winding reel 36 and an unwinding reel 37, the "old amount tape" being carried by reels 38 and 39, which are similar in all respects to the reels 36 and 37. As shown in Figures 3 and 15, the reels 36, 37, 38 and 39, comprise top and bottom discs 40 and 41, spaced apart by tubular body portions 42 which in turn are adapted to be journaled upon spindles 43 rigidly secured to and projecting vertically from the base 33.

The respective reels are removably secured to the spindles 43 by levers 44 pivotally connected to the upper surface of the top discs 40, eccentrically of the axes thereof and provided with notches 44a arranged to engage in annular grooves formed adjacent the upper ends of the spindles.

The movement of the "new amount tape" from its unwinding to its winding reel is guided and controlled by drums 45 and 46 and the movement of the "old amount tape" is similarly controlled by drums 47 and 48. Displacement, or slipping of the tapes, with respect to the drums, is prevented in the present instance by rows of spaced guide teeth 49 formed integrally with the surfaces of the several drums preferably adjacent their respective upper edges, for cooperation with similarly spaced rows of apertures 50, (Fig. 19) previously formed in the tapes. In order to compel the operator properly to arrange the tapes in the machine, there is a gap in the series of teeth 49, as shown in Fig. 3, and corresponding interruptions in the series of apertures 50, as shown in Fig. 19.

The drums 46 and 48 (Fig. 3) are in effect, idler guides, and are freely journaled on spindles 53 and 54 rigid with the base and extending parallel to the axes of the respective reels 36, 37, 38 and 39.

Both new and old amount tapes are adapted to be advanced predetermined increments in each cyclic operation of the machine. To this end the drums 45 and 47 (Fig. 14) are freely journaled on spindles 51 and 52 fixed to the base 33 and formed at their upper ends with collars adapted to prevent displacement of their respective drums. As shown in Figures 16 and 17, the spindles 51 and 52 are fitted with similar telescoping sleeves 55 and 56, which act to space the drums from the base and serve at the same time as bearing surfaces for similar pinions 57 and 58, arranged for meshing engagement with a rack bar 59 slidably supported in a boss 60 extending longitudinally of the base plate 33.

The drums 45 and 47 are adapted to be drivingly engaged with their respective pinions 57 and 58. As shown particularly, in Figures 14, 16 and 17, the drums carry similar spring-pressed plungers 61 and 62, adapted for movement longitudinally of their respective axes in bores extending substantially parallel with the axes of the drums. The lower ends of plungers 61 and 62 are yieldingly projected into operative engagement with cam notches 63 and 64, which in turn are formed in upwardly extending hub portions 65 and 66 of the respective pinions.

The pinions 57 and 58 are yieldingly urged into position to co-act with the plungers 61 and 62. As shown in Fig. 14, such means in the present embodiment of the invention comprises a leaf spring 67 anchored to an upstanding boss formed integrally with the base to permit its respective ends to freely act upon the under surfaces of flanged collars 68 and 69, which depend from the respective pinions. It will be evident that the spring 67 will normally tend to elevate the respective pinions into position to cause their cam notches to co-act with the plungers 61 and 62.

As will be observed from an examination of Figs. 12 and 14, the cam notches 63 and 64 are effective to provide uni-directional driving engagement between the pinions 57 and 58, and drums 45 and 47.

As shown by the direction of the arrows in Fig. 3, both tapes are advanced from right to left from their respective unwinding reels to the winding reels. Thus the winding drum 45 must rotate in a clockwise direction whereas the drum 47 is required to rotate in a counter-clockwise direction.

The previously described spring-pressed plungers 61 and 62, in cooperation with the cam-notched hubs 65 and 66 of the pinions 57 and 58 are effective to accomplish this result in each reciprocation of the rack 59. As will be evident from an inspection of Fig. 14, a forward movement of the rack bar 59 from the position shown in Fig. 12, will be communicated to pinion 57, and through the vertical edge of cam notch 63, to plunger 61, to rotate drum 45 in a clockwise direction. Conversely, a forward movement of rack 59 from the position shown in Fig. 12 will cause an idle movement of pinion 58 with respect to drum 47 since the plunger 62 will drop into the cam notch and ride idly out of it along its camming surface at the completion of each revolution of the pinion.

During the rearward stroke of rack bar 59 the pinion 57 will move idly with respect to drum 45, whereas pinion 58 will be drivingly connected to drum 47 through its plunger 62. Thus in each reciprocation of rack bar 59 the new amount and old amount tapes may be advanced a given increment through the medium of their respective driving drums.

Rotary movement of the drums 45 and 47 is frictionally communicated to the respective winding reels 36 and 38 to store the tapes thereon.

Referring particularly to Figs. 12, 14 and 15, belts 70 and 71, engaging the lower peripheral surfaces of drums 45 and 47, are lead over similar pulleys 72, freely journaled on the spindles 43, intermediate the lower end walls of the winding reels, and suitable thrust bearings 73, defined by the end surfaces of upwardly extending hubs 74 formed integrally with the base.

Studs 75, fixed to the bottom disc 41 of the winding spools and projecting therebelow, are adapted to be received in suitable apertures formed in upper end plates 76 of the pulleys 72, to provide a driving engagement between the latter and their respective winding reels. It will be evident that the driving engagement between the winding reels and their respective driving pulleys is such as to permit ready removal and replacement of the latter.

The rack 59 is adapted to be once reciprocated and brought to rest in a predetermined position as is shown in Fig. 12 as an incident to each cyclic operation of the machine; that is to say, the drive for the tapes is capable of advancing them a uniform distance for each cycle of operations of the machine, but, in practice, the tapes are advanced only as needed. In the present embodiment of the invention automatic means under control of the laterally movable paper carriage is effective to initiate a reciprocation of the rack 59, but it will be understood that manual means might additionally be employed to accomplish the same result. Referring to Figs. 6 and 7, a worm 77, drivingly connected to the motor 78 (Fig. 2) by pulleys 79, 80 and belt 81, is in constant meshing engagement with a worm wheel 82 (Fig. 7) loosely journaled on a stub shaft 83 rigid with the housing 29.

Overlying and fixed to the worm wheel 82 is a notched disc 84 which in turn is surmounted by a crank disk 85 journaled on shaft 83 and of greater diameter than the disc 84.

Adjacent its peripheral edge the crank disk is provided with a pivoted dog 86, normally urged in a counterclockwise direction as is viewed in Fig. 6 by a spring 87, to provide a driving engagement between disc 84 and crank disk 85.

A pawl 88 pivoted at 89 to a stationary part of the machine is urged in a counterclockwise direction by a spring 90 into engagement with a shoulder 91 formed on the peripheral edge of crank disk 85.

The dog 86 is released to the action of its spring 87 to establish a driving engagement between the notched disc 84 and crank disk 85 by means under control of the laterally movable paper carriage 11. Referring particularly to Figs. 2, 6, and 9, a lever 92 pivoted to a stationary part of the machine at 93, is normally urged by a spring 92a in a clockwise direction as viewed in Fig. 9, to raise a laterally turned end 94 into the path of an arm of the dog 86 to retain the latter in the position shown in dotted lines in Fig. 6. The opposite end of lever 92 is operatively connected to a lever 95 pivoted to the machine at 96, by means of a link 97. The rearward end of lever 95 underlies a push rod 98.

The push rod 98, as shown in Fig. 2, is arranged to be depressed, to lower the end 94 of lever 92 against the action of the spring 92a, as an incident to lateral movement of the paper carriage.

Rigid with the paper carriage is a control plate 100 extending longitudinally of the carriage and occupying a horizontal plane. The plate 100 is adapted to support a plurality of control elements 101, the form and construction of which may, for example, be identical with that disclosed in my before-mentioned application Serial No. 581,800. Each of the several control elements, as is described in said application, may be adjustably positioned on the control plate and equipped with one or more stop lugs (not shown), arranged to travel in a plurality of parallel paths defined by a group of selectors 102 (Figs. 1, 2 and 26) pivotally supported at 102a on the frame of the machine in underlying relation with respect to the control plate. The push rod 98, as will be seen in Fig. 2, underlies the right-hand one of the selectors 102, so that depression of that selector by a stop lug in any position of the carriage will function to displace the laterally turned end 94, of the lever 92, from its normal position in which it prevents engagement of the dog 86 with the disc 84, thus initiating a reciprocation of rack bar 59. Upon the completion of one revolution of the crank disk 85, the dog 86 is disengaged from the constantly rotating disk 84 by the projection 94, as shown in Fig. 8, the crank disk being thereby brought to rest in the position shown in Fig. 6 and held in that position by the spring 87 and the pawl 88.

A disengageable driving connection is provided between the crank disk 85 and rack bar 59 to permit the removal of base 33 from the machine. As shown in Figs. 3, 6, 7, 12 and 13, such connection is provided in this instance by a pitman 103, eccentrically pivoted to the crank disk 85 at 104 and detachably connected to the rack 59 by a pin 105 (Fig. 13) arranged to engage a slot 106 adjacent the rear end of the rack and opening toward the left as viewed in Fig. 12.

To prevent displacement of the pitman 103 while the base is withdrawn and so render difficult the reestablishing of a driving connection between the pitman and rack when the base is replaced, the pin 105 is elongated to project into bearing engagement with a guide slot 106 formed in a boss 107, which is rigid with the frame of the machine as particularly shown in Fig. 13. It will be obvious that when the base is withdrawn the pitman arm will be retained in a position to re-engage the rack when the base is again restored to operative position in the machine.

Manual means is provided to disable automatic advancing of the new and old amount tapes. Referring to Figs. 1, 17, and 18, a new amount key 108 is effective to lower the pinion 57 out of the path of the plunger 61, and thus prevent movement of the rack 59 from being communicated to drum 45. As shown particularly in Fig. 18, the stem 109 of new amount key 108, overlies the laterally turned upper end of a link 110, which in turn is pivotally connected to an arm 111 of a bail 112 operatively supported on a longitudinal shaft 113. Arms 114 of a yoke formed integrally with bail 112, embrace diametrically opposite sides of the flanged collar 68, of the pinion 57. As clearly shown in Fig. 17, depression of the new amount key functions to rotate bail 112 and its associated yoke 114 in a clockwise direction, to lower the pinion against the action of its spring 67 until its cam notch is out of the path of plunger 61. In this connection, it will be observed that the teeth of rack 59 are of sufficient width to maintain meshing engagement with the pinion when the latter occupies either its upper or lower positions. To prevent removal of the base without previously elevating the pinion 57 to operative position with respect to plunger 61, the yoke 114 is formed with a downwardly turned lug 115, adapted to engage a longitudinal slot 116, provided in the base 33 adjacent its left-hand edge as viewed in Fig. 17. It will be evident that lug 15 will function to prevent removal of the base so long as the pinion 57 occupies its lower position, so that the new amount key must be released to permit the pinion to rise, to position the square shoulder of the cam notch 63 in the path of the drum plunger before the base can be withdrawn.

The stem 117 (Fig. 18) of an old amount key 118 (Fig. 1) overlies the laterally turned upper end of a vertical link 119, which is operatively connected to an arm 120 of a bail 121, loosely journaled on the shaft 113. Arms 122 of a yoke formed integrally with bail 121 embrace diametrically opposite sides of the flanged collar 69 (Figs. 14 and 16), which depends from the pinion 58, as does the collar 68 from the pinion 57. A lug 123 turned downwardly from one of the yoke arms 122 is effective to engage the longitudinal slot 116, when the old amount key is operated to disable the driving connection between pinion 58 and plunger 62, in a way similar to that described in connection with the corresponding lug 115 on yoke 114.

Thus, the driving connections between rack 59 and the respective drums 45 and 47 can be manually disabled.

Means is provided for making a permanent record on the new amount tape of items entered in the machine. To this end, the new amount tape is arranged to be punched in every denominational order of the machine, at a height above a common reference line proportional to the digit entered in each denominational order. Such a means is shown in Figs. 3, 4, and 5, as comprising a die 124 rigidly connected to horizontal guide bars 125 and 126, which in turn are slidably supported in similar upstanding bearing posts 127, 128, 129 and 130. The unit comprising the die and its guide bars is normally urged to the right as shown in Figs. 4 and 5, by means of compression springs 131 and 131a, which telescope the guide bars and act between the posts 128 and 130 and collars 132 and 132a fixed to the respective guides in spaced relation with respect to posts 127 and 129.

The die is operatively connected to a rocking frame including a transverse shaft 133 journaled in suitable lugs formed integrally with the base, and a cross-bar 134 spaced from and rigidly connected to the shaft 133 by means of arms 135 and 136.

The rear ends of guide bars 125 and 126 are formed with similar downwardly opening slots 137, adapted to receive the cross-bar 134, the slots being of sufficient depth to allow clearance for the cross-bar when the frame is in its vertical position as is substantially illustrated in Fig. 4. The frame is adapted to be rocked in each cyclic operation of the machine to reciprocate the die 124 in a punching operation, but in normal practice the punching mechanism operates only when a new amount is being printed on the bill and accumulated in the totalizer 22, and is prevented from operating in other cycles, such as cycles in which old amounts are being printed and accumulated, spacing cycles, and total-taking cycles. The arm 136 is extended above cross-bar 134 to function as a crank, its upper end being provided with a laterally extending crank pin 138. Pivotally supported on a rigid part of the machine at 139 is a lever 140, an arm 141 of which is pivotally connected to a rearwardly extending pitman 142. A disengageable connection between the pitman 142 and the crank arm 136 is provided by a slot 143, which is adapted to receive the crank pin 138.

The driving motor 78 is arranged to rotate the cam 144 through 360 degrees in a clockwise direction as viewed in Figs. 4 and 5, in each cyclic operation of the machine. A roller 145 (Figs. 4 and 10) pivotally supported adjacent the peripheral edge of the cam is arranged to contact a cam face 146 of an arm 147 of the lever 140. A plate 148 fixed to the arm 147 has a laterally turned end 149 defining a cam adapted to cooperate with the roller 145 in timed relation with the operation of the latter part upon the cam surface 146.

The pitman 142 is arranged for either manual or automatic engagement with crank pin 138, to effect a rocking of arm 136, and a corresponding reciprocation of the frame comprising parts 133, 134, and the die 124.

Such engagement may be effected manually by means of a key 150 (Fig. 2), the stem of which, 151, is operatively associated in a well-known manner with a slide 152. The slide 152, is normally urged rearwardly by a spring 153, the resistance of which is overcome in depressing the key 150 to produce forward movement of the slide. The rear end of slide 152 as shown in Figs. 4 and 5, is fitted with a stud 154, positioned rearwardly of an arm 155 which in turn is normally urged in a clockwise direction as viewed in Figs. 4 and 5 by a spring 156 acting between the arm and a fixed stud 157.

The arm 155 is fixed to the right-hand end of a shaft 158 (Figs. 3 and 4) suitably journaled in the frame of the machine. The opposite end of shaft 158 has non-rotatably secured thereto, an arm 159, the free end of which is provided with a pin 160 which projects into a slot 161 (Fig. 4) formed adjacent the rear end of pitman 142. It will be evident that depression of the key 150 will move the slide 152 forwardly and thus rock the arm 155 and its associated shaft 158 and arm 159 in a counter-clockwise direction to lower the pitman 142 to a position in which its downwardly opening slot 143 will engage the crank pin 138.

Automatic engagement of pitman 142 with crank arm 136 may be accomplished under control of the laterally movable paper carriage in any desired position of the latter. This mechanism comprises a bell crank 162 (Fig. 4) pivoted at 96 and arranged to be operated by the carriage through a push pin 164. An upwardly and rearwardly extending bracket 165 which is rigid with the slide 152 is adapted to communicate movement from the bell crank to the slide 152 to thus rock the arm 155 and finally the pitman 142, as previously described.

The relationship of the cam surface 146 and the camming end 149 of plate 148 is such that when the lever 140 is rocked by the roller 145, a rapid and positive reciprocation will be imparted to the die 124 as indicated in Fig. 4, near the end of the first half of the cycle the die is advanced, and at the beginning of the second half the die is retracted.

To prevent displacement of the tape with respect to the die during the punching operation, the latter is formed of spaced plates 166 and 167 between which the tape is adapted to be fed. The plates 166 and 167 are formed with vertical rows of alined apertures 168 extending horizontally and co-axially through both plates. It will be understood that one such vertical row of apertures is provided for each denominational order of the machine and that the number of apertures in each row will be no fewer than ten so as to provide for a punching of holes from 0 to 9 inclusive. Additional holes may, of course, be utilized for the purpose of forming records of non-cumulative data if desired or to provide for the entry of amounts in the English currency system. The lowermost hole in the plates 166 and 167 is superfluous in the present embodiment of the invention.

The tape is punched in each numerical order by means including a series of punches, one such punch being associated with every numerical order of the machine.

As shown in Figs. 2, 4 and 5, the type bars 12 are fitted with downwardly extending tails 169 to the lower end of each of which tail a plate 170 is secured. Each of the plates 170 is formed with a rearwardly extending punch 171 of such size as to be slidably received in the apertures 168 in plates 166 and 167. As will be noted in Figs. 4 and 5, the forward ends of the apertures 168 are beveled to guide the punches thereinto.

When the die 124 is moved forwardly in a punching operation as shown in Fig. 4 the relatively stationary punches 171 will be caused to penetrate the tape which is held between the plates of the die as has been explained, and thereafter the springs 131 and 131a will cooperate with the cam 149 to quickly restore the die to its normal position as indicated in Fig. 5.

Referring to the new amount tape shown at the lower right-hand portion of Fig. 19, the four dotted circles near the lower edge of the tape represent zeros, the next higher circle represent "3," the next higher "5," the next higher "8" and the uppermost "9." It will be understood from the number of dotted circles that the present machine has nine numerical orders.

Now coming to the old amount tape it will be recalled that the machine comprising the present invention is sensitive to the perforations in a tape such as a previously formed new amount tape to automatically enter amounts in the machine. Mechanism effective to accomplish such purpose is fully disclosed in Figs. 3, 4 and 5.

A nest of sensing or analyzing pins generally indicated at 172 is arranged to be controlled either manually or automatically to analyze the apertures in a previously punched tape and thus control the extent to which the type bars 12 and their associated racks 23 and 24 are permitted to rise so as to correspondingly regulate the extent of rotation which shall be imparted to the totalizer wheels 22.

The nest of analyzing pins 172 comprises a pin housing or bearing block 173 rigidly connected to the base 33 and extending upwardly therefrom in parallel relation with the axes of the reels, guiding drums, and die 124. A plurality of pins 174 are slidably supported in the bearing block 173, there being a vertical row of pins for each denominational order of the totalizer and ten pins in each such vertical row, so as to provide one pin corresponding to every numerical value on each totalizer wheel from zero to nine. The several pins 174 include a body portion 175 adapted for bearing engagement with the block 173 and a forwardly extending shank 176 of lesser diameter than the body portion 175, which terminates in a flanged head 177.

A plate 178, which is operatively supported in spaced parallel relation with respect to the pin bearing block 173, slidably receives the shanks of the several pins, their heads functioning to limit rearward movement by abutting contact with the forward surface of the plate.

Each of the pins is provided with a spring 179, which telescopes its shank and acts between the rear surface of the plate 178 and the shoulder defined by its enlarged body portion to normally urge the pins in a rearward direction.

A pair of guide bars 180 and 181 (Fig. 3) are rigidly attached to the plate 178 and extend forwardly through suitable bearings formed in upstanding bearing posts 182 and 183.

It will be observed from an examination of Figs. 3 and 4, that rearward movement of the plate 178 will permit the springs 179 to yieldingly project their respective pins rearwardly into a position to overlie a forwardly extending lug 184 formed integrally with the plate 178, which is associated with the end of each type bar tail piece 169. Movement of the plate 178 to permit such operation of the pins 174 is controlled by mechanism including a frame comprising a transverse shaft 185 journaled in the lower ends of the bearing posts 182 and 183, and rigidly connected to a cross-bar 186 by means of crank arms 187 and 188.

The forward ends of guide bars 180 and 181 are formed with downwardly opening similar slots 189 adapted to embrace the cross-bar 186, and, like the slots 137 in the guide bars 125 and 126, are of sufficient depth to permit clearance between the cross-bar 186 and the guide bars 180 and 181, when the former part is in a substantially vertical position as shown in Fig. 5.

A driving connection between the motor 78 and the rigid frame including parts 186, 187, 188 is effected by a crank pin 190 extending laterally from an upwardly extending portion of the arm 188. An arm 191 of a bell crank 192 pivoted on the axis 139 is normally urged in a clockwise direction as viewed in Figs. 4 and 5 by a spring 191a. The arm 191 is pivotally connected at 193 to a longitudinally extending link 194, the upper edge of the link being formed with a slot 195, which is adapted to receive the crank pin 190. The free end of an arm 196 of the bell crank 192 is fitted with a cam roller 197 arranged to follow the peripheral surface of cam 144, so as to rock the bell crank 192 comprising arms 191 and 196 in each cyclic operation of the machine. This rocking movement in turn is communicated to the link 194 to reciprocate the latter.

The link 194 is arranged to be operatively connected to crank pin 190 by either manual or automatic means. The manual connecting means includes a key 198, Figs. 1 and 2, the stem of which 199, Figs. 2 and 5 is effective to rock a crank-like arm 200 in a clockwise direction as viewed in Fig. 5 to move a slide 201 forwardly against the action of its spring 202. The slide 201 is provided adjacent its rear end with a stud 203 which is positioned rearwardly of an arm 204 non-rotatably secured to a shaft 205 journaled in the housing 29 as indicated in Fig. 3. A tensile spring 206 acting between the arm and the fixed stud 157 normally tends to maintain the former part in engagement with the stud 203. The opposite end of the shaft 205 has fixed thereto an arm 207, the operating end of which is provided with a stud 208 lying in a slot 209 adjacent the rear end of link 194. It will be seen that when the key 198 is depressed the slide 201 will operate through stud 203, arms 204 and 207 to rock the link 194 about the pivot 193 to cause its forward slotted end to move from the position shown in Fig. 4 to the position illustrated in Fig. 5 and thus establish a driving connection with the plate 178.

Fig. 2 shows the machine at rest. When the machine is cycled, the cam 144 will make one revolution in the direction indicated by the arrow in Fig. 2 and stop. During the early portion of the first half of the cycle, the working surface 211 of the cam 144, acting on the roller 197, imparts a rearward stroke to the link 194, thus allowing the pins 174 to bear against the old-amount tape. Those pins which are opposite apertures in said tape representing digits above zero pass into such apertures, as shown in Fig. 5, into the path of the lugs 184 in the corresponding numerical orders, so as to limit the upward movement of the type bars and racks in those orders. The old amount is thus caused to be printed on the bill and accumulated in the cross-footing totalizer 22. Near the end of the second half of the cycle, the cam surface 211 of the cam 144 allows the spring 191a (Fig. 5) to restore the link 194, crank arm 188, plate 178 and pins 174 to their initial position, as in Fig. 2.

Automatic engagement of link 194 with crank pin 190 may be accomplished under control of the laterally movable paper carriage in any desired position of the latter. This mechanism comprises a bell crank 162a pivotally supported on the axis 96 and arranged to be operated by the carriage through a push pin 163. A bracket 201a rigid with the rearward end of slide 201, and similar in this instance to the bracket 165 on slide 152, is adapted to communicate movement from the bell crank 162a to the slide 201 and thus rock the arm 204 and finally the shaft 205, and thus arm 207 in a counter-clockwise direction to elevate the forward end of link 194 to position its slot for engagement with crank pin 190.

To prevent displacement of the old amount tape from the plane defined by the surface of the pin bearing 173 a guide plate 212 is provided. The guide plate 212 is supported in fixed spaced relation from the surface of the pin bearing 173 as indicated in Fig. 4, and is formed with a plurality of rows of apertures coinciding in number and axially aligned with the bores in pin bearing 173.

As has been previously indicated the plate 20 is normally in position to obstruct the upward path of the pins 15 and must consequently be displaced prior to the taking of a total or the automatic entering of an item in the machine under the control of the old-amount tape. Such displacement of the plate 20 is accomplished automatically as an incident to either manual or automatic operation of the slide 201 for the purpose of analyzing a section of the old amount tape through the medium of the pins 174.

Referring to Figures 1, 4 and 5, the plate 20 is pivotally supported at 213 upon the upstanding arm 214 of a bail 215 which in turn is operatively supported on a transverse shaft 216. An arm 217 (Fig. 5) rigid with the bail 215 is normally urged in a clockwise direction by a tensile spring 218 to hold the detent plate 20 in its rear position and to maintain the lower end of the arm 217 in engagement with one arm of a lever 219 (Fig. 26) pivoted in the machine frame. The other arm of lever 219 lies in the path of a lug 220 (Fig. 5) on the slide 201. Thus it will be seen that when the key 198 is depressed or when the carriage operates to move the slide 201 forwardly, the lever 219 will be turned in a clockwise direction as viewed in Figure 1, to rock the bail 215 in a counter-clockwise direction as viewed in Fig. 5, thus withdrawing the plate 20 from the path of the pins 15.

Hence, after a section of the old amount tape which is to be analyzed, has been operatively positioned with respect to the nest of pins 172, the plate 20 will be displaced to permit the type bars to rise until their associated stops 184 contact such of the pins 174 as have been projected through apertures in the tape. Referring to the "old amount" tape shown at the lower left-hand portion of Fig. 19, the four holes near the lower edge of the tape represent zeros, the next higher hole represents "2," the next higher "5," the next higher "6," the next higher "7" and the highest "9." It will be seen that all of the numeral type bars of the machine are controlled in their rising movement by the perforations in the "old amount" tape. It will be understood that the main rock shaft 25 may be oscillated either manually or under control of the motor 78, to effect such rising movement of the type bars. A motor bar 221 (Fig. 1), may be utilized to energize a circuit to the motor 78 when the machine is to be power operated.

It will be observed in Figure 5 that the punches 171 are vertically offset from their related stops 184 by an amount substantially equivalent to the vertical dimension of the body of the stop, so that wherever a perforation is made in the tape by a bar which has risen only to the zero position, the aperture so formed will align with one of the lowermost or zero row of pins 175. Thus, when the same tape is employed on the old amount or analyzing side of the machine, pins 175 in the lowermost row will be projected through perforations made by bars which did not rise above the zero position when the tape was employed on the new amount or recording side of the machine, thereby preventing such bars from rising above the zero position in the automatic old-amount-entering operation.

Now coming to the means whereby the totalizer 22 may be controlled either manually or automatically, in the performance of operations involving addition, subtraction, sub-totaling, final totaling, etc.

The totalizer is rotatably mounted upon a transverse shaft 225 (Fig. 21), which in turn is supported for sliding movement longitudinally of the machine.

The pinions are moved into and out of mesh with the racks 23 and 24 by means such, for example, as two links 226 (Figs. 21 to 24), one at each side of the machine. The forward ends of links 226 have bearings to receive the ends of the shaft 225, and their rear ends are pivoted at 227 to two arms 228, which are rigidly secured to a shaft 229 that is journaled in the frame work of the machine.

The means herein shown for swinging the arms 228, to move the pinions into and out of mesh with the racks, comprises an arm 230 (Figs. 28 and 29), which is rigid with the right hand arm 228 and carries a pin 231 that engages the notched end of an arm 232. The arm 232 is secured upon a short shaft 233 that is journaled in the machine frame. Also fixed to said shaft is an arm 234. The arm 234 is swung by means of a lever 235 (Figs. 21 to 24) pivoted at 236, said lever having a cam slot 237 therein to receive a stud 238 on the arm 234. The lower portion of the cam slot 237 imparts the meshing and de-meshing movements required in adding, and positive totaling operations, while the upper portion of the cam slot 237 produces the meshing and de-meshing movements incident to subtracting and negative totaling operations.

The lever 235 is swung by means of a link 239 having notches 240 and 241 in its opposite edges. The notch 240 is adapted to receive a stud 242 on the cam lever 235, the notch 241 being adapted to receive a stud 243 on said lever. The studs 242 and 243 are at opposite sides of the axis 236, and hence it will be seen that when the link 239 is in engagement with the pin 242, vertical movement of the link 239 will cause reciprocation of the lever 235 to cause operation of the lower portion of the cam slot 237 on the stud 238; whereas, when the link 239 is in engagement with the pin 243, the lever 235 will be swung to cause operation of the upper portion of the cam slot 237 on the stud 238. The link 239 is pivoted to one end of a rocker arm 244, which is pivoted in the machine frame at 245. The other end of the rocker arm 244 is pivoted to a link 246, having a notch 247 adapted to receive a pin 248 on a lever 249. The last mentioned lever is pivoted on the axis 250 in the machine frame and has a pin and slot connection with an arm 251 which is pivoted at 252.

The means for swinging the lever 249 comprises an arm 253 fixed upon the main rock shaft 25. On said arm is pivoted at 254, a pawl 255 having two shoulders 256 and 257, and a hook 258. The pawl 255 is influenced by tensile spring 259. On the lever 249 is a pin 260 arranged to be engaged by the shoulder 256. On the arm 251 is a pin 261 arranged for engagement by the shoulder 257.

262, Figure 26, is a detent pivoted on the frame work at 262a. It has two cam notches to receive a pin 262b carried by the rocker arm 244. A spring 262c connected to the detent holds the latter in engagement with the pin. This spring-actuated detent helps to move the cam lever 235 suddenly into its totalizer meshed, or its totalizer-demeshed position, and to hold it in such position.

Referring now to Figure 21, which shows the parts in initial position, the pinions being in mesh with the adding racks 23: When the main rock shaft begins its forward movement, the arm 253 swings in the direction indicated by the arrow in Figure 21, whereupon the shoulder 256 engaging the pin 260 (assisted by the spring detent 262) causes the lever 249 to turn counterclockwise into the position shown in Figure 22, whereby the link 246 is lifted and the link 239 lowered, thereby swinging the cam lever 235 downwardly and thus promptly placing the pinions 22 in neutral position between the two sets of racks. The pinions are thus moved out of mesh with the racks 23 just before the racks begin rising to the extent corresponding to the item set up on the keyboard. As the arm 253 completes its upward stroke, the surface 263 on the pawl 255, comes into engagement with the pin 261 on the arm 251, causing the pawl 255 to assume the position shown in Figure 22.

On the return stroke of the rock shaft 25, the shoulder 257 of the pawl 255, operating against the pin 261 (and assisted by the spring detent 262), swings the arm 251 into the position shown in Figure 21, thereby, through the connections previously described, swinging cam lever 235 to the position shown in Figure 21, and thus returning the pinions 22 into mesh with the racks 23. This occurs promptly after the commencement of the return stroke of the arm 253, and in the continuing operation of the machine the racks 23 descend, thereby turning the pinions 22 to accumulate thereon the amount set up in the keyboard.

Any desired means may be used to prevent casual rotation of the pinions while they are out of mesh with the racks, as, for example, that fully disclosed in my Patent No. 1,965,611, dated July 10, 1934.

When a positive total (whether subtotal or final total) is to be printed, and/or recorded on a tape, the pinions are retained in mesh with the racks 23 during the upward movement thereof. The means whereby the upward movement of the arm 253 is rendered ineffective to withdraw the pinions from the racks 23 will now be described, reference being made particularly to Figure 26. The total key 264 and the subtotal key 265 are carried by key stems 266 and 267 respectively. The lower ends of these stems are arranged to engage independent bails 268 and 269, pivoted at 270 in the machine frame. The bails 268 and 269 are arranged to engage lugs 271 and 272 on a total slide 273 and a subtotal slide 274, respectively. Depression of a key 264 or 265 causes forward movement of the corresponding slide 273 or 274. On the total slide 273 is an upstanding portion 275, which is yieldingly connected through a tension spring 276 to an arm 277 pivoted in the machine frame at 278. The spring 276 normally holds a pin 279 on the arm 277 against a lug 280 on the total slide. Rigid with the arm 277 is an arm 281, which is connected by means of a link 282 to the lower end of the link 246. It will be seen that depression of the total key 264 will cause the arms 277 and 281 to swing forward to withdraw the notch 247 from the pin 248, and to place the edge 283 of the link 246 against a pin 284 on the lever 249, the spring 276 yielding to permit the key 264 to complete its downward movement.

In the ensuing cycle of operations of the machine, the arm 253 swings upwardly, swinging the lever 249 counterclockwise idly without imparting any movement to the link 246, hence the pinions remain in mesh with the racks as the latter rise. As the lever 249 completes its counterclockwise movement, the pin 284 comes into registry with a notch 285 in the link 246, whereupon the spring 276 moves the notch into engagement with the pin. When the lever 253 starts on its return stroke, the shoulder 257 of the pawl 255 engages the pin 261 and swings the lever 249 clockwise, thereby lifting the link 246 and thus causing the pinions to be withdrawn from the racks 23 before the latter descend, thus leaving the pinions standing at zero or clear. The completion of the positive final total cycle leaves the pinions in neutral position.

When a subtotal is to be taken, the subtotal key 265 is depressed, thereby drawing the subtotal slide 274 forward. On said slide is a post 286, which engages a pin 287 on the total slide and thus causes the link 246 to be disengaged from the pin 248 and engaged with the pin 284 as described in connection with the operation of taking a final total. Since, however, the pinions are not to be cleared, they should remain in mesh with the racks 23 during the descent of the latter. To effect this result, a cam surface 288 is provided on the upper end of post 286 to engage a stud 289 on an arm 290 pivoted on the axis 291. Rigid with the arm 290 is an arm 292 carrying a stud 293. When the subtotal slide 274 is drawn forward, the cam 288 places the stud 293 in position to depress the pawl 255, when the arm 253 approaches its upper position. Consequently, when the arm 253 makes its return stroke, the shoulder 257 of the pawl is unable to engage the pin 261 and, therefore, the pinions are not withdrawn from the racks 23. Near the end of the downward stroke of the arm 253, the hook 258 engages the pin 260, and as the arm 253 completes its downward movement, the hook 258 turns the lever 249 clockwise, thereby lifting the link 246, lowering the link 239, and lowering the cam arm 235, and thus moving the pinions 22 into neutral position, this occurring a moment after the racks have returned to their normal down position.

When a total is to be taken, whether a final total or a subtotal, the detent plate 20 must be moved forward to permit rising movement of those of the pins 15 which are connected to type bars which are required in the printing of the total or subtotal. For this purpose, each of the slides 273 and 274 (Fig. 26) has a lug 295 which, when the slide is moved forward, engages the right hand arm of the lever 219 to rock bail 215 in a counter clockwise direction as viewed in Figure 26, thereby withdrawing detent plate 20 from a position to block the pins 15.

Figure 27:
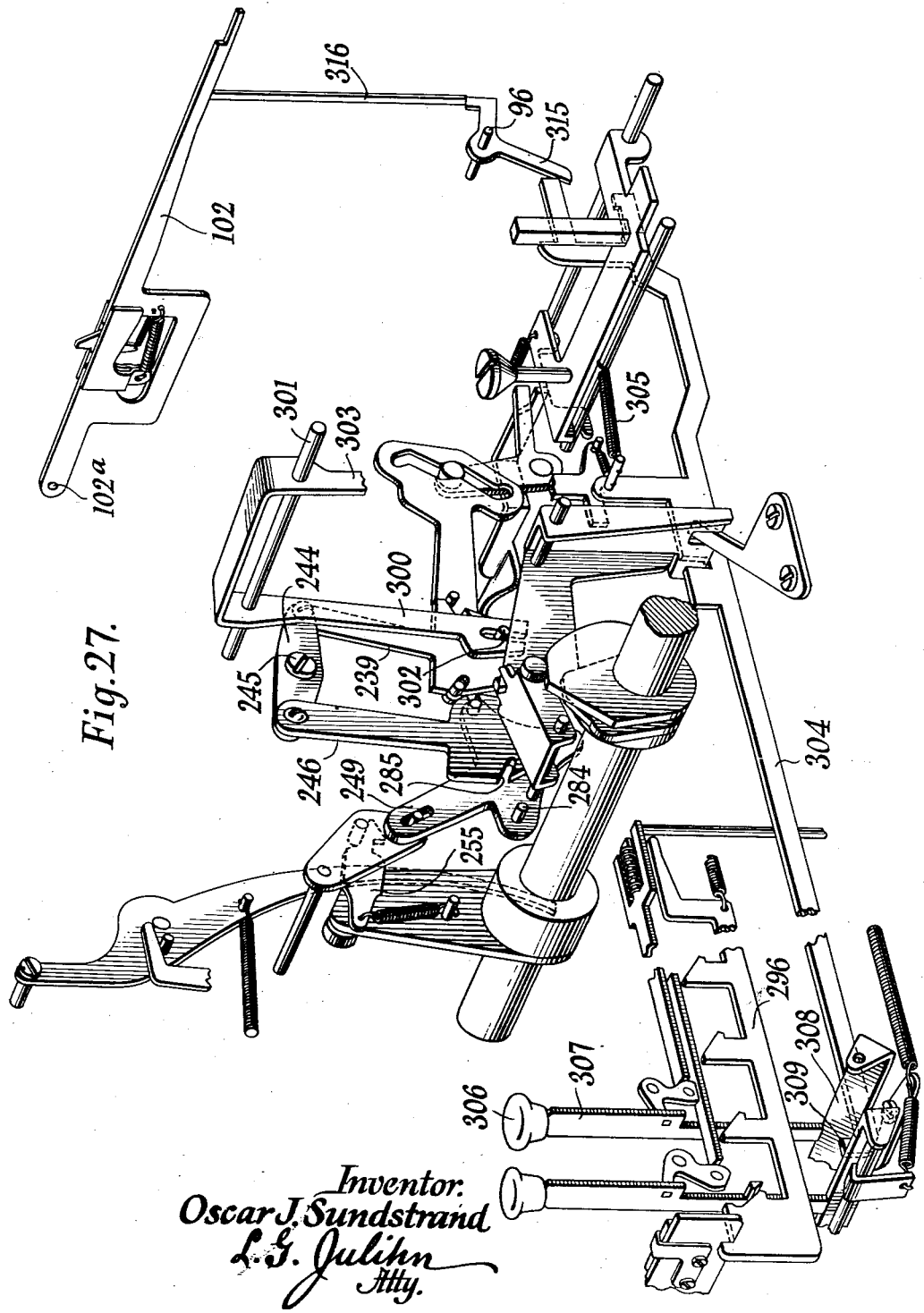
Figure 27 is a fragmental perspective view illustrating the subtraction key and its connections with the totalizer, the parts being shown in the position occupied when the main rock shaft is at the end of its forward stroke in the operation of subtracting an item.

The total key and the subtotal key, together with a number of other controlling keys, are arranged to be latched in a depressed position during a given cycle of operations of the machine by means including a slide 296 (Fig. 27), the function and particulars of which are fully described in the beforementioned application Serial No. 581,800.

Now coming to the use of the machine in connection with the accumulation of subtractive amounts:

Referring particularly to Figure 21; after adding or taking a positive total, the link 239 is in engagement with the pin 242, the pinions 22 being then in mesh with the adding racks 23. Reciprocation of the link 239 will therefore shift the pinions into and out of mesh with those racks. When an amount is to be subtracted, the link 239 is shifted out of engagement with the pin 242 and into engagement with the pin 243. The means for thus shifting the link 239 comprises an arm 300, Figure 27, pivoted on the axis 301 and having a forked lower end to engage a pin 302 on the link 239. Rigid with the arm 300 is an arm 303, the lower end of which is yieldingly connected in any preferred manner to a subtraction slide 304. A spring 305 normally holds the subtraction slide 304 in its rear or ineffective position. The slide is pulled forward into effective position by means of a subtraction key 306 having a stem 307 which is arranged to operate a bail 308 that engages an upstanding lug 309 on the front end of the subtraction slide. When the subtraction key is depressed, the slide 304 is drawn forward and held forward through the latching of the subtraction key in depressed position, thereby shifting the link 239 until the edge 310 of the link stops against the pin 243, the pin 242 being still within the notch 240. In the ensuing forward stroke of the rock shaft 25, the link 239 is moved downwardly thereby swinging the lever 235 into position to move the pinions 22 out of mesh with the adding racks 23. As soon as the pin 243 is raised sufficiently to register with the notch 241, the link 239 is yieldingly moved to place said notch in engagement with said pin 243. In the return stroke of the rock shaft 25 the link 239 is lifted, thereby swinging the lever 235 down, so as to cause the upper portion of the cam slot 237 to act upon the roller 238, whereby the pinions 22 are placed in mesh with the subtraction racks 24 before the latter start to descend.

The machine may incorporate automatic means, such as are fully disclosed in application Serial No. 581,800, to automatically cause the pinions 22 to mesh with the subtracting racks 24 when a negative total exists in the totalizer, likewise the machine may be equipped with any desired form of mechanism to automatically introduce a fugitive one.

The lateral movement of the paper carriage may be utilized to automatically control the totaling, subtotaling, subtracting and other functions of the totalizer represented by the pinions 22. The totalizer may automatically be conditioned for a final totaling operation by effecting forward movement of the slide 273 (Fig. 26) under control of the carriage. Such forward movement is accomplished by means of a bell crank 311, pivoted on the axis 96, and interposed between the total slide 273 and a push rod 312. The rod 312 is arranged to be depressed by one of the nest of selectors 102. It will be obvious that a stop lug in any one of the control elements 101 and associated with push rod 312, will function to depress said push rod 312, thereby moving the slide 273 forwardly to condition the machine for the taking of a final total.

The carriage is effective to move the subtotal slide 274 (Fig. 26) through the medium of a bell crank 313 pivoted on the axis 96. A push rod 314 transmits power from one of the selectors 102 to the bell crank 313. As is the case in the taking of final totals, a stop lug in any one of the control elements 101 on the carriage, in the plane of the selector associated with push rod 314, will function to move the slide 274 forwardly, thus conditioning the machine for the taking of a subtotal from the totalizer pinions 22.

The carriage control of the subtraction slide 304 (Fig. 27), is effected by a bell crank 315, pivoted on the axis 96, and interposed between the rear end of slide 304 and a push rod 316 which underlies one of the selectors 102. Thus, it will be apparent that a stop lug on the carriage, positioned in the plane of the selector associated with push rod 316 will function to move the slide 304 forwardly, thereby automatically conditioning the machine for a subtracting operation.

It will be understood that the machine may be automatically operated under control of the carriage to effect a spacing cycle. Means effective to accomplish this end are well known in the art, and reference may be had to Sundstrand application Serial No. 581,800, for a full description of such mechanism.

Means is preferably provided for deprising the carriage of control of the various machine functions. Herein I have shown means for that purpose which is similar to that fully described in my application Serial No. 581,800. Fig. 1 of the present application indicates at 870 a normalizer key which is arranged to depress the forward arm (not shown) of a lever 876 (Fig. 2) and thus raise the rear arm of said lever. Said rear arm is connected to a slide plate 879 which is guided for vertical movement in the machine frame. Upward movement of the slide plate 879 from the position illustrated in Fig. 2 disables the escapement mechanism as explained in application Serial No. 581,800, so that the carriage will not automatically tabulate to the next columnar position after a cycle of operations of the machine.

As shown in Fig. 2 the slide plate 879 is located in a plane extending transversely of the planes of the selectors 102 and beneath the free ends of said selectors. The length of the upper edge of the slide plate 879 equals or exceeds the width of the series of selectors. When the slide plate is raised through depression of the normalizer key 870, the upper edge of said plate engages the lower sides of the free ends of the selectors 102 and holds them against depression by stop lugs on the control elements 101 on the paper carriage.

Means similar to that shown in application Serial No. 581,800 may be provided for latching the normalizer key 870 in depressed position.

Preliminary to undertaking a series of accounting operations, such for example as are involved in the preparation of gas bills, the new and old amount keys 108 and 118 are released to permit withdrawal of the base section 33 from the machine.

Of course, it will be understood that full utilization of the facilities of the machine depends upon the simultaneous use of both new and old amount tapes, but the first series of operations are necessarily employed in preparing the first old amount tape for use. To this end, a blank tape is stored on the unwinding reel 37 (Fig. 3), its end being fed over the drum 46, through the die 124, and over the drum 51 to the winding reel 36. The section 33 is now restored to position in the machine.

The controlling elements 101 on the paper carriage are adjusted to produce the cycles which are indicated in Fig. 19 at the points in the carriage travel also indicated in that view, and to allow an advancing movement of the amount tapes before the machine is cycled in the columnar positions where the tapes are to be punched. In doing such work as is illustrated in Fig. 19, the control element in the spacing-cycle position at the left is preferably used to initiate such advance of the tape.

The operator now proceeds with the preparation of bills. After placing a billhead on the platen 10, the carriage is advanced to the position identified by the legend "Previous reading," as a consequence of which the crossfooter 22 is automatically conditioned for a subtraction cycle. With the carriage in the Previous reading position, the operator sets up the Previous reading and the Previous reading), and clear the and cycles the machine to print the amount of the Previous reading on the bill and enter said amount subtractively in the crossfooter. The carriage then advances to the Present reading position, where the operator sets up the Present reading in the machine by means of the keys 18 and cycles the machine, the amount of the Present reading being thereby printed on the bill, entered additively in the crossfooter, and, since the control element 101 in this position is provided with a lug to cause depression of the push pin 164, it is also recorded on the tape 34 in the form of perforations. The carriage then advances to the spacing-cycle position, where the machine is cycled in preparation for the taking of the total from the crossfooter. The carriage then advances to the Consumption position, where the machine is cycled to print the total (which is the difference between the Present reading and the Previous reading), and clear the crossfooter. The preparation of the bill having been thus completed, the operator continues with the preparation of bills for all other (or a certain number of the) customers. Upon the completion of that lot of bills, the tape 34 constitutes a record of the Present readings of those customers, which readings, of course, will be the Previous readings when the next month's bills for those customers are to be prepared. The base section 33 is now removed from the machine and the tape 34 rewound onto a reel 39, as diagrammatically indicated in Fig. 20, thus becoming the old amount tape 35.

When the next month's bills are to be made out for the customers just referred to, the old amount tape is fed over the drum 48, through the analyzing section 173, over the drum 47 and to the winding reel 38; a blank tape is placed on the reel 37 and fed over the drum 46, through the punching die 124, over the drum 45 and to the winding reel 36; the base section 33 is replaced in the machine, and the operator proceeds to prepare the bills in the same sequence as before and in the manner previously described, except that the Previous readings need not be set up by means of the keys 18, since the old amount tape 35 and the pins 174 operating under an appropriate controlling, as previously explained, constitute automatic mechanism for setting up the Previous readings.

As the operator proceeds with the preparation of the bills, he may come to a customer for whom no Present reading has been taken and whose consumption therefore cannot be billed at this time, but must be deferred until the following month. It is consequently necessary to preserve the Previous reading for use in preparing such future bill. The preservation of the Previous reading involves its transfer from the old amount tape 35 to the new amount tape 34. Assuming that the carriage has stopped in the first or spacing cycle position shown at the left in Fig. 19 and that the operator sees that no Present reading has been taken for the next customer, he depresses the key 150, thereby manually setting the punching mechanism for operation in the Previous reading position. He then tabulates the carriage to the Previous reading position, where the machine is cycled to set up the Previous reading under the control of the old amount tape 35 and record said amount on the new amount tape 34.

If a new customer (for whom there is no Previous reading) appears among the old customers for whom bills are being prepared, it is necessary to disable the automatic old-amount set-up mechanism and disable the feed for the old amount tape, since otherwise the old amount tape would get out of step with the accounts of the old customers. The disablement of the automatic old-amount set-up mechanism is effected by depressing the normalizer key 870. This key is depressed and latched down at some time after the machine has cycled in the Final total position and before the carriage reaches the Previous reading position, and is manually released after the carriage has been tabulated out of the Previous reading position and before the machine has been cycled in the Present reading position. After setting up the Present reading for the new customer by means of the keyboard, the key 118 is depressed to disable the feed for the old amount tape, after which the machine is cycled to print the Present reading on the bill, record said amount on the new amount tape, and enter the amount in the cross footer.

It will be understood that numerous changes may be made in the construction herein disclosed without departing from the scope of the appended claims, and that the machine may be operated in various ways to produce various classes of work.

In the claims, the term "sheet" has been used to denote either a tape or a card, and the word "amount" has been employed in a board sense.

If a new customer (for whom there is no Previous reading) appears among the old customers for whom bills are being prepared, it is necessary to prevent the machine from picking up a Previous reading from the old amount tape, and it is also necessary to prevent the old amount tape from advancing during the printing of this bill. This may be accomplished by depressing the normalizer key 870 while the carriage is in the columnar position corresponding to the spacing cycle at the left in Figure 19. The carriage may then be manually tabulated (without the machine cycling) through the spacing cycle column and through the Previous reading column. The normalizer key is then manually released and the Present reading of the new customer is set up on the keyboard, and the machine operated. This puts the Present reading on the new amount tape, prints it on the bill, and puts it in the crossfooter. The machine then continues as in other operations. This bill will, of course, show a consumption equal to the Present reading, but since this bill is made merely for record purposes, the misleading consumption figure is of no consequence. The details of construction and operation of the normalizer key 870 and the manual tabulating mechanism are disclosed in application Serial No. 581,800.

It will be understood that numerous changes may be made in the construction herein disclosed without departing from the scope of the appended claims, and that the machine may be operated in various ways to produce various classes of work.

In the claims, the term "sheet" has been used to denote a tape, a sheet, or a card, and the word "amount" has been employed in a broad sense.

I claim as my invention:

1. An accounting machine having, in combination, a paper carriage movable laterally into a series of columnar positions, a totalizer, and means under the control of the carriage for introducing into the totalizer predetermined numbers in predetermined columnar positions, said means including a record sheet having perforations representing said numbers in predetermined order, totalizer-actuators, actuator-controlling means arranged to be controlled by the sheet, and means controlled by the carriage for feeding the sheet past said actuator-controlling means.

2. An accounting machine having, in combination, a paper carriage movable laterally into a series of columnar positions, a totalizer, and means under the control of the carriage for introducing into the totalizer a predetermined number in a predetermined one of said columnar positions, said means including a record sheet having perforations representing said number, totalizer-actuators, and actuator-controlling means arranged to be controlled by the sheet, and means controlled by the carriage for operating said actuator-controlling means.

3. An accounting machine having, in combination, a paper carriage movable laterally into a series of columnar positions, a totalizer, and means under the control of the carriage for introducing into the totalizer predetermined numbers in predetermined columnar positions, said means including a device representing a record of said numbers in predetermined order, totalizer-actuators, actuator-controlling means arranged to be controlled by said device and means controlled by the carriage for feeding the representing device past said actuator-controlling means.

4. An accounting machine having, in combination, a paper carriage movable laterally into a series of columnar positions, a totalizer, a device carrying a plurality of records, and means, under the control of the carriage for introducing into the totalizer numbers represented in the records carried by said device, in a predetermined columnar position of the carriage upon cycling of the machine.

5. An accounting machine having, in combination, a reciprocable paper carriage movable in one direction into a series of columnar positions corresponding to the columns of a bill, a totalizer, a device carrying perforated records, and means, under the control of the carriage when moving in said direction, for introducing into the totalizer data represented in the records carried by said device, in a predetermined columnar position of each of a succession of bills, upon cycling of the machine.

6. An accounting machine having, in combination, a reciprocable paper carriage movable in one direction into a series of columnar positions corresponding to the columns of a bill, a totalizer, and means under the control of the carriage when moving in said direction for introducing into the totalizer a predetermined number in a predetermined columnar position of each of a succession of bills, said means including a record sheet having perforations representing said numbers in predetermined order, totalizer-actuators, actuator-controlling means arranged to be controlled by the sheet, and means controlled by the carriage for feeding the sheet past said actuator-controlling means a distance corresponding to a succession of bills.

7. An acounting machine having, in combination, a paper carriage movable laterally into a series of columnar positions, printing mechanism, a device carrying a record, and means, operating under the control of the carriage, for controlling the printing mechanism in accordance with the data represented on the record carried by said device, to print the data in a predetermined columnar position of the carriage, upon cycling of the machine.

8. An accounting machine having, in combination, a paper carriage movable laterally into a series of columnar positions, a device carrying a record, record feeding means, means controlled by the carriage for operating the feeding means in a predetermined columnar position of the carriage, printing mechanism, and means operating under control of the carriage, for controlling the printing mechanism in accordance with the data represented on the record carried by said device, to print the data in a different columnar position of the carriage, upon cycling of the machine.

9. An accounting machine having, in combination, a paper carriage movable laterally into a series of columnar positions, a device carrying a record, and means, operating under the control of the carriage, for sensing the data represented on the record carried by said device, in a predetermined columnar position of the carriage, upon cycling of the machine.

10. An accounting machine having, in combination, a paper carriage movable laterally into a series of columnar positions, printing mechanism, a device carrying a record, and means, controlled in accordance with movement of the carriage, for controlling the printing mechanism in accordance with the data represented on the record carried by said device, to print the data in a predetermined columnar position of the carriage, upon cycling of the machine.

11. An accounting machine having, in combination, a paper carriage movable laterally into a series of columnar positions, a device carrying a record, and means, controlled in accordance with movement of the carriage, for sensing the data represented on the record carried by said device, in a predetermined columnar position of the carriage, upon cycling of the machine.

OSCAR J. SUNDSTRAND.